United States Patent [19]
Beltz et al.

[11] 3,769,174
[45] Oct. 30, 1973

[54] MICROTISSUE RESPIROMETER
[76] Inventors: Alex D. Beltz, 1451 Dale Dr., Savannah, Ga. 31406; Ezra Paul Reineke, 680 Gunson, East Lansing, Mich. 48823
[22] Filed: Dec. 30, 1968
[21] Appl. No.: 787,953

[52] U.S. Cl................ 195/127, 23/232, 23/254, 23/259
[51] Int. Cl................................................ C12b 1/22
[58] Field of Search........................ 195/127; 23/259

[56] References Cited
UNITED STATES PATENTS
3,431,078  3/1969  Yokohama............................ 23/259
3,486,983  12/1969  Gilson................................ 195/127

Primary Examiner—A. Louis Monacell
Assistant Examiner—Robert M. Elliott
Attorney—Wynne and Finken

[57] ABSTRACT

A respirometer having reaction and compensating vessels attached to the respective arms of a manometer. A gas injetion means having a measurement means for measuring the amount of gas injected by the gas injection means is interconnected to the vessels and manometer through a three-way valve which has positions first, interconnecting manometer, reaction vessel, compensating vessel and gas injection means, second, blocking all the interconnections of the first position, and third interconnecting only the reaction vessel, that corresponding arm of the manometer and the gas injection means.

1 Claim, 4 Drawing Figures

PATENTED OCT 30 1973

3,769,174

INVENTORS
ALEX D. BELTZ
EZRA P. REINEKE
BY Don Finkelstein
ATTORNEY

MICROTISSUE RESPIROMETER

BACKGROUND OF THE INVENTION

1. Field of the Invention

This invention relates to the measurement art and more particularly to an improved gas measuring arrangement particularly adaptable to measuring the gas absorption by preselected gas absorbing samples.

2. Description of the Prior Art

In many applications it is desired to measure precisely the amount of gas that may be absorbed by a gas absorbing sample. Where the amounts of gas absorbed are comparatively small, accurate instrumentation is necessary in order that the measurement of the gas absorbed may be done in a comparatively short time.

In the biological sciences it is very often the desire to measure the oxygen absorption by, for example, samples of living organisms or fresh tissue samples. Usually such devices heretofore utilized have generally been termed Microtissue Respirometers, or Microrespriometers. As utilized in the past, the familiar Warburg apparatus or Bilson apparatus have not proven entirely satisfactory, since, in those embodiments of the prior art arrangements in which a manometer was used comparatively complex valving arrangements were necessary in order to provide the original gas charging and subsequent gas measuring connections, as well as attempting to prevent blow-out of the manometer fluid by inadvertent pressurization of one arm or the other thereof. While differential pressure guages have heretofore been utilized in some applications, the comparatively high cost of the differential pressure gauge comtpared to the cost of a simple U-tube manometer, while automatically preventing any condition such as manometer blow-out, has limited the application of said differential pressure gauge respirometers. Particularly, for investigations undertaken by students in high school or college, it is desired to provide as inexpensive an apparatus as practical, that still performs accurate measurements. Consequently, the use of manometers as differential pressure gauges in such a Microtissue Respirometer has long been desired provided that the possibility of manometric blow-out can be substantially eliminated.

SUMMARY OF THE INVENTION

Accordingly, it is an object of Applicant's invention herein to provide an improved gas measuring arrangement.

It is yet another object of Applicant's invention herein to provide a gas measuring arrangement adapted to measure comparatively small changes in pressure.

It is yet another object of Applicants' invention herein to provide a gas measuring apparatus utilizing a U-tube manometer as a differential pressure guage between a reaction vessel in which the gas absorption sample is located, and a pressure compensating vessel.

The above and other objects are met, in accordance with one embodiment of Applicants' invention herein, by providing a reaction vessel in which the gas absorbing sample is placed. A pressure compensating vessel is also supplied. A U-tube manometer is connected between the reaction vessel and pressure compensating vessel by a crossover tube that provides a communication between the two arms of the U-tube manometer above the liquid level of the preselected manometer fluid in the manometer.

The three-way valve means is provided in the crossover tube and has a first port connected to the first arm of the manometer and the reaction vessel and a second port connected to the second arm of the manometer and to a pressure compensating vessel. The valve is also provided with a third port that is connected to the supply of the gas used to replenish that absorbed by the sample in the reaction vessel.

In this embodiment of Applicants' invention which, for example, may be in the measurement of oxygen utilized by animal tissue or a small organism culture, the third port of the valve means is connected to a supply of oxygen. Also, when such organic samples are under investigation it may also be desired to have a gas absorption material in the reaction vessel in order to absorb any gas, such as carbon dioxide, that might be emitted by the gas absorbing sample during the test.

The valve means, in this embodiment of Applicants' invention, has fundamentally three positions that are utilized in making a gas absorption measurement. In a first position, all three of the ports of the valve are open and communicating with each other. This allows the pressurization of the reaction vessel and the pressure compensating vessel to the line pressure of the manifold that is connected to the third port of the valve. In this position, of course, the pressures are balanced on both sides of the manometer and therefore a high differential pressure that could cause the manometer fluid to be blown out of the U-tube cannot exist.

When it is desired to commence the test, the valve may be turned to a second position wherein all three of the ports are blocked from each other port. In this position, again, a high differential pressure across the manometer is avoided since while the apparatus is in this position the gas is being absorbed by the gas absorption sample, and consequently, pressure is lowered in the predetermined range on the first side of the manometer and, therefore, there is a rise in the liquid level of the manometer on that side within a known, predetermined range. It will be appreciated that any gas that is evolved by the pressure absorbing sample may be absorbed by the gas absorbing substance that is also placed in the reaction vessel within a separate well therein.

After a preselected time period the valve is turned to a third position in which the first port connected to the reaction vessel and first arm of the manometer is open to the line, or manifold pressure while the second port, that is connected to the compensating vessel and second side of the manometer is blocked. Sufficient gas from the gas supply is then admitted to the reaction vessel to bring the manometer back to the same level as it was at the beginning of the preselected time period. The amount of gas that is necessary to achieve this condition is carefully measured and represents the amount of gas that has been absorbed by the gas absorption sample during the time period.

The valve means is then turned back to the first position where the unit is again in balance. When the unit is in the third position, as described above, it can be seen that high differential pressures cannot exist across the manometer either, and thus, during a complete cycle of the system there is no opportunity for a large pressure differential to build up across the manometer. Further, complete operation is achieved in this embodiment of Applicants' invention by operation of merely one valve to control the flow of gas to and from the different portions of the test apparatus.

A plurality of these microtissue respirometers may be connected to the same gas supply through their respective third ports on the valve means by connection to the manifold supply of the gas. Each such microtissue respirometer is, of course, independently operable, with the single gas supply and measuring device being utilized to provide a convenient measurement of a plurality of samples.

While the thermodynamic gas laws allow ready calculation of the exact amount of gas that is utilized regardless of the relative sizes of the reaction vessel and the pressure compensating vessel, Applicants' prefer that the reaction vessel and pressure compensating vessel have similar volume, and preferably, during the test time period be maintained at substantially the same temperature by means of, for example, a water bath. By providing these similar volumes, a constant temperature and barometric pressure correction for the calculations of the measured amount of gas that is utilized to reposition the manometer fluid at the end of the test time period can be used and a comparatively straightforward measurement of the amounts of gas utilized may be made. That is, for example, the gas may be injected by a syringe that is driven by a micrometer screw adjustment in which the micrometer screw adjustment is directly calibrated into volumetric measurement of the amounts of gas per turn of micrometer screw. The amount of gas thus measured directly can then be reduced to standard conditions by a simple application of the gas laws.

BRIEF DESCRIPTION OF THE DRAWINGS

The above and other embodiments of Applicants' invention may be more fully understood from the following description taken together with the accompanying drawings wherein similar reference characters refer to similar elements throughout and in which.

DESCRIPTION OF THE PREFERRED EMBODIMENTS

Before detailing a description of the preferred embodiment of Applicants' invention, Applicants wish to point out that they have selected for utilization as an illustrative use of Applicants' improved GAS MEASURING APPARATUS an embodiment in which the apparatus is used as a MIcrotissue Respirometer to measure the amount of oxygen utilized by an organic specimen in a given time period. It will be appreciated, however, that the selection of this utilization of Applicants' invention is for the purpose of defining the operational characteristics of Applicants' IMPROVED GAS MEASURING ARRANGEMENT and that the same principles may equally well be utilized in many other embodiments. Thus, the particular gas and particular gas absorbing samples selected for description herein have been chosen for illustrative purposes only, and are not to be construed as limitations upon Applicants' invention.

Figure 1:
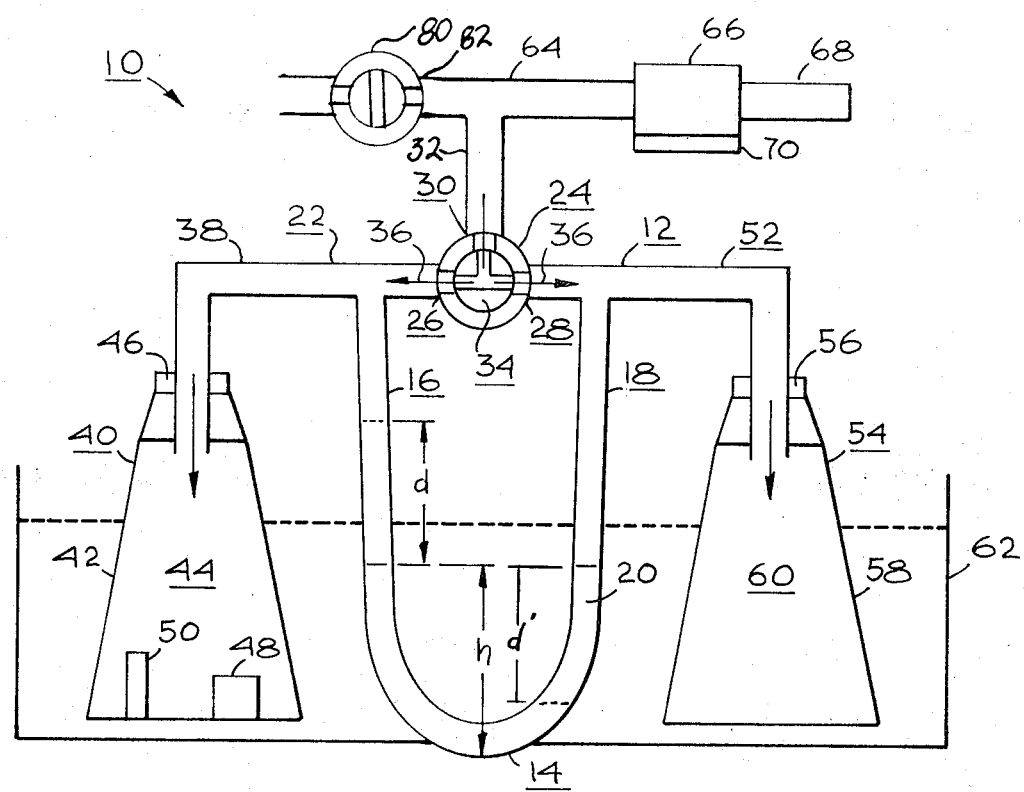
FIG. 1 is a semi-schematic representation of one embodiment of Applicants' invention.

Referring now to FIG. 1, there is shown a semi-schematic representation of one embodiment of Applicants' invention generally designated 10. As shown thereon, there is a MIcrotissue Respirometer 12, having a U-tube manometer 14 that is provided with a first arm 16 and a second arm 18 and a manometer fluid 20 contained therein. For the condition of equal pressure in the first arm 16 and the second arm 18 of the manometer 14, the manometer fluid has an equal level in both arms of the manometer, as indicated by the letter "h" on FIG. 1. A crossover tube 22 is connected to the first arm 16 and second arm 18 above a preselected spaced distance of the level "h" of the fluid in the manometer for the balanced pressure condition, and the crossover tube 22 is provided with a valve means 24 having a first port 26 that is connected to the first arm 16, a second port 28 that is connected to the second arm 18 of the manometer 14, and a third port 30 that is connected to a gas supply tube 32. The valve 24 has a plug 34 that is provided with a "T" passage therein, and, as illustrated on FIG. 1, the "T" passage of the port 34 allows the flow of gas from the gas supply tube 32 into each of the first arm 16 and second arm 18 of the manometer 14, as shown by the arrows 36. Thus, the first position of the valve 24, illustrated in FIG. 1, is a balanced pressure condition in which gas is allowed to flow from the gas supply tube 32 into both sides of the manometer 14.

The first arm 16 of the manometer is connected to a first tube means 38 that communicates with a reaction vessel 40 having walls 42 defining a preselected reaction vessel cavity 44 having a first volume. The tube means 38 is detachably sealed into the reaction vessel 40 by means of, for example, a sealing plug 46.

Placed within the reaction vessel 44 there may be a gas absorbing sample, which, in this embodiment of Applicants' invention, may be a fresh, microthin tissue slice of rat liver 48 that is to be investigated. There may also be placed in the reaction vessel 40 a gas absorbing material 50 to absorb any gas, such as carbon dioxide, that is emitted by the gas absorbing sample 48 during the testing period. For example, the gas absorbing media 50 may be potassium hydroxide to absorb the carbon dioxide.

A second tube means 52 is connected to the second arm 18 of the manometer 14 and is detachably sealed in a pressure compensating vessel 54 by means of, for example, a seal plug 56. The pressure compensating vessel 54 has walls 58, defining a compensating vessel cavity 60 therein having a second predetermined volume.

In the preferred embodiment of Applicants' invention the first volume of the reaction vessel cavity 44 is approximately equal to the second volume of the compensating vessel cavity 60 in order that minimum calculations and corrections need to be applied to the measured amount of gas that is utilized, as described below in greater detail.

Further, in order to minimize other thermodynamic considerations, Applicants prefer that the reaction vessel 40 and pressure compensating vessel 54 be maintained at substantially the same and constant temperature during the time period in which the gas absorbing structure 48 is tested. This may be achieved by placing them both in a temperature controlled water bath means 62.

The gas supply tube 32 may be connected to a gas manifold 64 in which there is injected the gas that is absorbed by the gas absorbing structure 48, by means of a syringe means 66 driven by a micrometer drive 68. When the reaction vessel 40 and compensating vessel 54 are maintained at a substantially uniform temperature and, preferably, a constant temperature, throughout the test procedure, Applicants have found that the micrometer drive which, for example, may be a micrometer drive as manufactured by Micro-Metric Instrument Company, Cleveland, Ohio, may be calibrated directly in volumetric measurements of the gas from gas supply 70 that is injected into the manifold 64 by the syringe 66.

Figure 2:
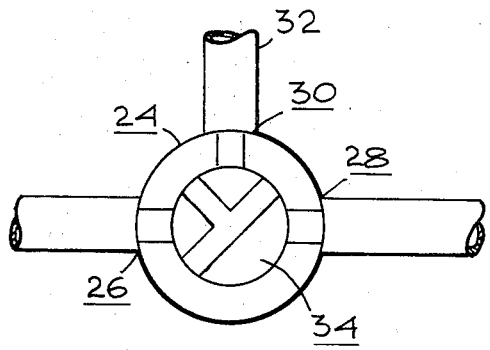
FIG. 2 illustrates a valve means of Applicants' invention in its second position.

When it is desired to commence the test of the gas absorption characteristics of the rat liver slice 48, the plug 34 of the valve 24 is turned to the second position, as illustrated in FIG. 2. As shown in FIG. 2, in the second position each of the first port 26, second port 28 and third port 30 of the valve 24 are blocked and there is no flow of gas into or out of the manifold gas supply tube 32, pressure compensating vessel 54 or reaction vessel 40. During this test time period gas is absorbed by the rat liver slice 48 thereby lowering the pressure on the first arm 16 of the manometer 14 and, after a given time period, the lower pressure therein allows the manometer fluid to rise to a height above the original height in the first arm 16 by an amount indicated by the letter "d" on FIG. 1. Meanwhile, the fluid in the arm 18 of the manometer 14 descends a similar amount as indicated by the letter "d" on FIG. 1. Any gas emitted by the rat liver slice 48 may be absorbed by the gas absorption medium 50.

Figure 3:
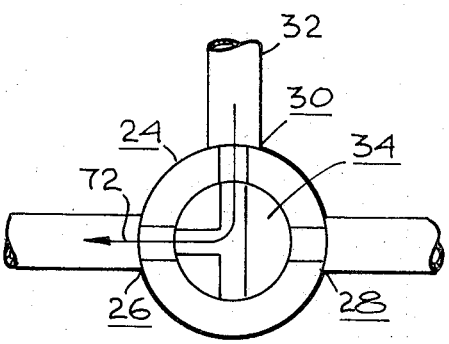
FIG. 3 illustrates the valve means of Applicants' invention in its third position.

After the preselected test time period the plug 34 of the valve means 24 is turned to a position illustrated in FIG. 3 wherein there is free flow of gas from the gas supply tube 32 at the third port 30 through the "T" passage in the plug 34 to the first port 26 connected to the first arm 16 and the reaction vessel 40. The micrometer drive 68 drives the syringe 66 to admit gas back into the reaction vessel 40 until the pressure in the reaction vessel and, consequently, the first side or arm 16 of the manometer 14 moves the manometer fluid 20 back down to the level indicated by the letter "h", which was the level of the manometer fluid 20 at the beginning of the test time period. The volume of gas thus required to reposition the manometer fluid is a measure of the amount of gas absorbed by the gas absorbing structure, the rat liver slice 48 during the test time period. At the conclusion of the test the valve plug 34 may be repositioned to the position shown in FIG. 1 and another test may be commenced by detaching the reaction vessel 40 from the sealing plug 46 and placing additional samples therein for further testing.

It can be seen that in a first position of the valve 24, shown in FIG. 1, the pressure on the first arm 16 and second arm 18 of the manometer 14 are balanced. In the second position, illustrated in FIG. 2, the only differential pressure that is allowed to build up is the result of the actual gas utilization by the sample. In the third position, as illustrated in FIG. 3, only the manifold line pressure is permitted to flow into the reaction vessel 40 and first arm 16 of the manometer 14, and, since this is the original pressure at which the compensating vessel 54 was pressurized, there is no large pressure differential ever placed across the manometer 14. Further, by the interconnection of the structure of Applicants' invention, the single valve 24 allows complete control of the entire test procedure. That is, only single valve need be utilized for controlling the flow of gases during the test procedure. It will be appreciated, however, that those skilled in the art may, in some applications of Applicants' invention, find it desirable to utilize different size first volumes in the reaction vessel and second volumes in the pressure compensating vessels and/or allowing temperature variation during the testing period. Suitable corrections to the measured amount of gas fed by the syringe 66 to reposition the manometer fluid 20 after the test period, in such an embodiment of Applicants' invention, may be made to take into account the different volumes and/or temperatures.

A two way stop-cock valve 80 is provided at the open end 82 of the manifold 64. Valve 82 must, of course, be closed during the measurement of the gas from the syringe 66.

Figure 4:
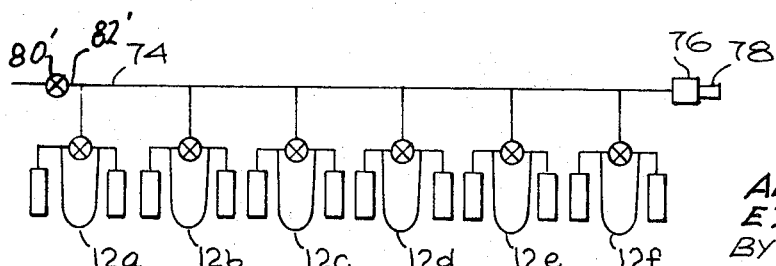
FIG. 4 is a schematic respresentation of another embodiment of Applicants' invention.

It will be appreciated that a single gas supply manifold injection means, such as the syringe 66, and measurement means, such as the micrometer drive 68, may be utilized with a plurality of microtissue respirometers 12. One such embodiment of Applicants' invention is illustrated in schematic form on FIG. 4. As shown thereon there is a plurality of microtissue respirometers 12a, 12b, 12c and 12d, 12e and 12f, all of which may be similar to the microtissue respirometer shown in FIG. 1. However, in this embodiment of Applicants' invention each of the plurality of microtissue respirometers is connected to a single gas manifold 74 into which a gas injection means such as a syringe 76 which may be similar to the gas injection syringe 66 injects gas upon being driven by an appropriate drive means such as a micrometer drive 78, which may be similar to the micrometer drive 68 shown in FIG. 1. Operation of each of the microtissue respirometers may be accomplished independent of the operation of the others and sequential measurements of the gas absorbed by each microtissue respirometer during this time period may be made. That is, with only a single gas supply from the syringe 76 simultaneous measurements are not permissible, but sequential measurements can quite readily be accomplished.

Two way valve means 80' is provided at the open end 82' of the manifold 74 which, of course, must be closed during the measurement of the gas from the syringe 76.

This concludes the description of Applicants' invention of the IMPROVED GAS ABSORPTION ARRANGEMENT. From the above it can be seen that Applicants provide a comparatively inexpensive and foolproof gas absorption structure for measuring the amount of gas absorbed by a particular structure and in which a manometer may be utilized without danger of over pressurization of the manometer during operation.

What is claimed is new and desired to be secured by Letters Patent of the United States is:

1. A respirometer comprising:
   a fluid manometer having a first arm and a second arm;
   a reaction vessel connected to said first arm;
   a compensating vessel connected to said second arm;
   gas injection means including,
   measurement means for measuring the amount of gas injected by said gas injection means; and valve means connected to said manometer, reaction vessel, compensating vessel, and gas injection means; said valve means having a first position interconnecting said manometer, reaction vessel, compensating vessel and gas injection means; a second position blocking all said interconnections of said first position; and a third position blocking said compensating vessel and its manometer second arm and interconnecting said reaction vessel and its manometer first arm and said gas injection means whereby a measured amount of gas can be injected into said reaction vessel and its manometer first arm.

* * * * *